(12) United States Patent
Rajan et al.

(10) Patent No.: US 9,949,003 B2
(45) Date of Patent: Apr. 17, 2018

(54) SYSTEM AND METHOD FOR VIRTUAL NETWORK TOPOLOGIES AND VPN IN MULTI-LAYER NETWORKS

(71) Applicant: Infinera Corporation, Annapolis Junction, MD (US)

(72) Inventors: Rao Rajan, Cupertino, CA (US); Biao Lu, Sunnyvale, CA (US); Parthiban Kandappan, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/094,585

(22) Filed: Apr. 8, 2016

(65) Prior Publication Data

US 2017/0208377 A1 Jul. 20, 2017

Related U.S. Application Data

(60) Provisional application No. 62/280,535, filed on Jan. 19, 2016.

(51) Int. Cl.
| | | |
|---|---|---|
| *H04Q 11/00* | (2006.01) | |
| *H04J 14/02* | (2006.01) | |
| *H04J 14/08* | (2006.01) | |

(52) U.S. Cl.
CPC ...... *H04Q 11/0062* (2013.01); *H04J 14/0212* (2013.01); *H04J 14/0223* (2013.01); *H04J 14/083* (2013.01); *H04Q 11/0005* (2013.01); *H04Q 2011/009* (2013.01); *H04Q 2011/0016* (2013.01); *H04Q 2011/0033* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0002776 A1* | 1/2003 | Graves | ............... | H04J 14/02 385/16 |
| 2006/0153496 A1* | 7/2006 | Tanobe | ............... | H04J 14/0227 385/24 |
| 2011/0052191 A1* | 3/2011 | Beshai | ............... | H04Q 11/0005 398/52 |
| 2013/0129354 A1* | 5/2013 | Tanaka | ............... | H04B 10/272 398/66 |
| 2015/0318949 A1* | 11/2015 | Boertjes | ............... | H04J 14/0204 398/79 |
| 2015/0372781 A1* | 12/2015 | Frankel | ............... | H04J 14/06 398/47 |

* cited by examiner

*Primary Examiner* — David Payne
*Assistant Examiner* — Omar S Ismail
(74) *Attorney, Agent, or Firm* — David L. Soltz

(57) ABSTRACT

Systems and methods for a multi-layer network to achieve network resource isolation among clients using the same server network, such as a VPN in a multi-layered network and interaction within the node, may include interaction between a server layer (e.g. L0 Photonic network) and the client layer (e.g. L1 network) that help the client layer (L1) gather information about the server-layer (L0) connection affinities. For example, the use of server layer (L0) connection affinities to construct Virtual Network Topologies (VNT) and/or network abstractions for customer traffic isolations in client layer (L1), the use of VNT to offer physical and/or logical network resource isolation for L1 customers, and provide L1 VPN services in a multi-layer environment.

16 Claims, 13 Drawing Sheets

SYSTEM AND METHOD FOR VIRTUAL NETWORK TOPOLOGIES AND VPN IN MULTI-LAYER NETWORKS

CLAIM OF PRIORITY UNDER 35 U.S.C. § 119

The present Application for Patent claims priority to Provisional Application No. 62/280,535 entitled "System and Method for Virtual Network Topologies and VPN in Multi-Layer Networks" filed Jan. 19, 2016, and assigned to the assignee hereof and hereby expressly incorporated by reference herein.

FIELD OF DISCLOSURE

This disclosure relates generally to optical communication networks and more specifically, but not exclusively, to virtual topologies in multi-layered optical communication networks.

BACKGROUND

Multi-layered optical communication networks have many benefits but many problems as well, such as the presence of physical layer impairments. The multi-layered network problems can be decomposed into four subproblems: deciding the lightpaths of the virtual topology (logical topology design), routing the electronic layer traffic on the resulting virtual topology (traffic routing), routing the lightpaths on the physical topology (lightpath routing), and assigning the wavelengths to lightpaths (wavelength assignment). The first two problems correspond to the MPLS layer and can be referred as the single-layer virtual topology design problem, while the remaining two make up the routing and wavelength assignment (RWA) problem in the WDM layer. For successful communication through the established lightpaths, physical layer impairments should also be considered in the RWA problem, together with wavelength continuity and fiber capacity constraints.

Due to the large number of variables and constraints in both layers, a complete joint solution to these four problems has not proven tractable so far for moderate and large size networks. When they are solved separately, care must be taken to provide a strong integration between the solutions; otherwise, the complete solution may result in having a worse performance. Because of the computational complexity of the joint problem, most approaches focus on the subproblems corresponding to one layer and omit those arising in the other layer, or make simplifying assumptions to relax some of the subproblems.

Many RFCs have been published to address these issues. For example:

- RFC2702 defines requirements for Traffic Engineering (TE) over MPLS networks. Specifically, it defines resource class and Affinity constructs to allow for various TE policy implementations.
- RFC3630—defines OSPF extensions to advertise resource class information as Administrative Group (AG).
- RFC 7308—enhances AG construct to go beyond 32 limit.
- RFC 3209—defines RSVP-TE extensions to carry Affinity information in signaling.
- RFC 5212—defines MN/MRN requirements.

One significant problem is that multi-layer networks typically operate as client-server layers. Server-layer connections may be required for client layer to offer services. The aforementioned RFCs cover how Resource Color and Affinity concepts can be applied at a given client or network layer only and not in a multi-layer context. What is needed is an approach that may be used in a multi-layer network to achieve network resource isolation among clients using same server network, such as a VPN in a multi-layered network described herein.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: a controller of a time division multiplexed network, the time division multiplexed network configured to transport each of a plurality of packets with a digital frame format in a respective one of a plurality of time slots and the controller comprises a memory and a logic circuit configured to: configure a first optical link in a photonic network, the photonic network configured to transport each of a plurality of optical signals, each of the plurality of optical signals having a respective one of a plurality of wavelengths; assign a first optical signal of the plurality of optical signals to the first optical link, the first optical signal having a first wavelength of the plurality of wavelengths; assign the first optical link to a first grouping of optical links of the photonic network; associate the first grouping of optical links with a plurality of switches; associate the first optical signal with the plurality of switches; associate the first grouping of optical links and the first optical signal with the controller; and transmit the first optical signal over the first optical link.

In another aspect, an apparatus including: a first controller configured to: configure a first optical link in a photonic network, the photonic network configured to transport each of a plurality of optical signals, each of the plurality of optical signals having a respective one of a plurality of wavelengths; assign a first optical signal of the plurality of optical signals to the first optical link, the first optical signal having a first wavelength of the plurality of wavelengths; assign the first optical link to a first grouping of optical links of the photonic network; associate the first grouping of optical links with a plurality of switches; associate the first optical signal with the plurality of switches; associate the first grouping of optical links and the first optical signal with a controller of a time division multiplexed network, the time division multiplexed network configured to transport each of a plurality of packets with a digital frame format in a respective one of a plurality of time slots; and transmit the first optical signal over the first optical link.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1A:
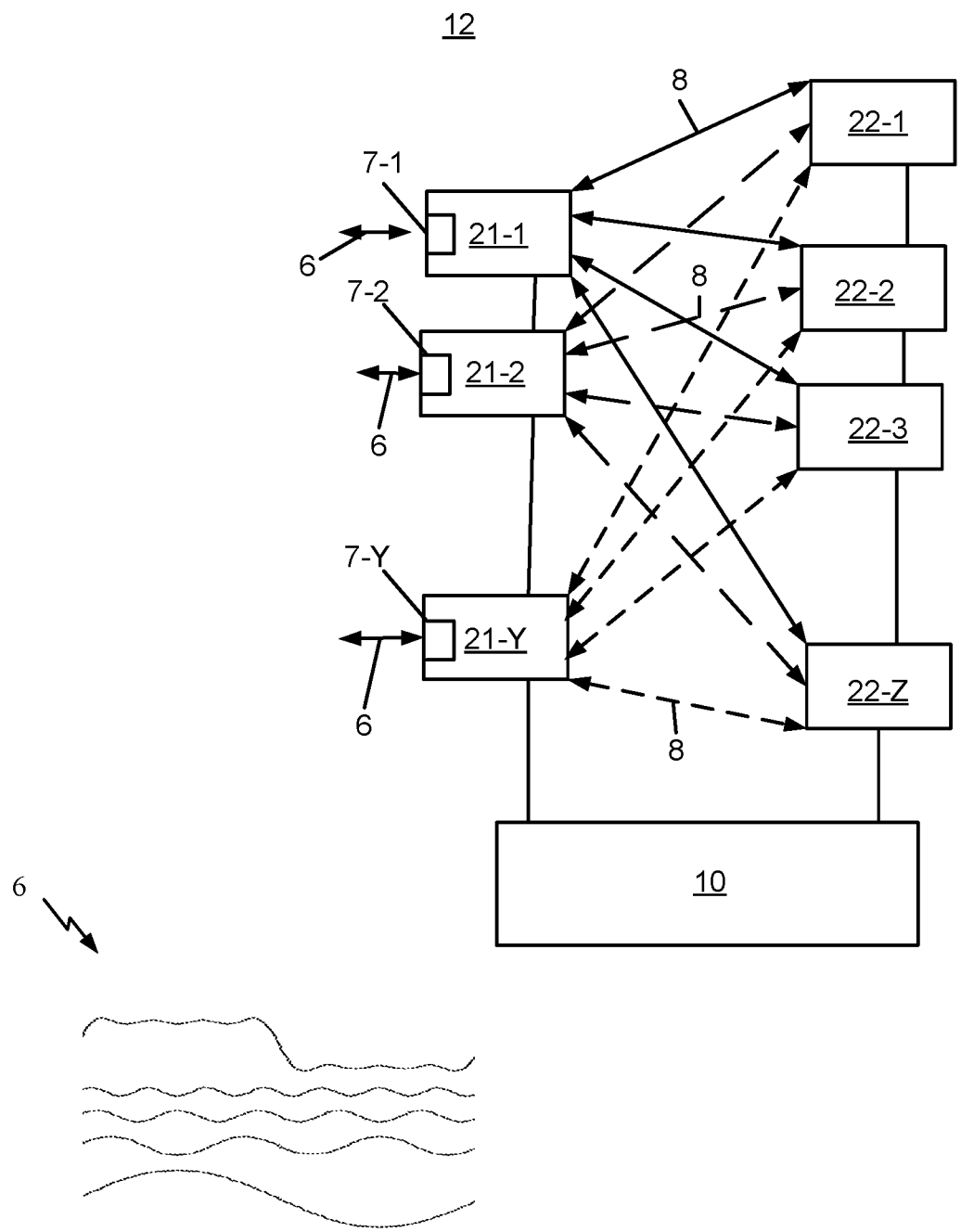
FIG. 1A illustrates an exemplary node of a network in accordance with some examples of the disclosure in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example, some aspects of the disclosure detail use in a multi-layer network to achieve network resource isolation among clients using the same server network, such as a VPN in a multi-layered network and interaction within the node. Specifically, interaction between a server layer (e.g. L0 Photonic network) and the client layer (e.g. L1 network) that help the client layer (L1) gather information about the server-layer (L0) connection affinities. For example, the use of server layer (L0) connection affinities to construct Virtual Network Topologies (VNT) and/or network abstractions for customer traffic isolations in client layer (L1), the use of VNT to offer physical and/or logical network resource isolation for L1 customers, and provide L1 VPN services in a multi-layer environment.

The following terms are used herein to describe the inventive concepts:
Resource Color & Resource Affinity—RFC 2702 defined terms
Administrative Group—RFC 3630 defined term for resource color
L0 network—refers to Photonic or Wavelength network that carry traffic in the form of light (different color wavelengths).
Other terms ROADM or WSON or Spectrum Switched networks
L1 Network—refers to TDM network that carry traffic in digital frames. E.g. OTN, SDH, SONET, etc.
L2 Network—refers to Ethernet.
L3 network refers to IP
Server Layer—a network layer that provides services to client layer above
Client Layer—a network layer that depends on services from server layer.
SNC—Sub Network Connection, is a connection realized between two end points in a network.

As described in RFC 2702, resource (links or network connections) class attributes are administratively assigned parameters which express some notion of "class" for resources. Resource class attributes can be viewed as "colors" assigned to resources such that the set of resources with the same "color" conceptually belong to the same class. When applied to links, the resource class attribute effectively becomes an aspect of the "link state" parameters. In addition, Resource class affinity attributes associated with a link or connection (data flows inside a label switch signaling path) can be used to specify the class of resources that are to be explicitly included or excluded from the path of the link. These are policy attributes which can be used to impose additional constraints on the path traversed by a given link. Resource class affinity attributes for a signal may be specified as a sequence of tuples: <resource-class, affinity>; <resource-class, affinity>. The resource-class parameter identifies a resource class for which an affinity relationship is defined with respect to the link. The affinity parameter indicates the affinity relationship; that is, whether members of the resource class are to be included or excluded from the path of the link. Specifically, the affinity parameter may be a binary variable which takes one of the following values: (1) explicit inclusion, and (2) explicit exclusion.

As described in RFC 3630, an Administrative Group for a link contains a 4-octet bit mask assigned by the network administrator. Each set bit corresponds to one administrative group assigned to the interface. A link may belong to multiple groups. By convention, the least significant bit is referred to as 'group 0', and the most significant bit is referred to as 'group 31'. The Administrative Group is also called Resource Class/Color.

FIG. 1A is a diagram of exemplary components of node 12. As shown in FIG. 1A, node 12 may include a controller 10 configurable to control the operation of the node 12 including connection admission (e.g. a software defined networking controller capable of connection admission control), line cards or modules 21-1, 21-2, . . . , 21-Y (referred to collectively as "line modules 21," and individually as "line module 21") (where Y>=1) connected to switching planes 22-1, 22-2, . . . 22-Z (referred to collectively as "switching planes 22," and individually as "switching plane 22") (where Z≥1). Controller 10 may be an application, such as in a SDN, that manages flow control to enable intelligent networking. Controller 10 may be based on protocols, such as OpenFlow, that allow servers to tell switches (e.g. node 12) where to send packets (e.g. packet 417). The controller 10 may logically lie between network devices (e.g. node 12) at one end and applications at the other end. Controller 10 may be configured such that communications between applications and devices (e.g. node 12) have to go through the controller 10. The controller 10 may include a logic circuit and a memory configured to uses protocols such as OpenFlow to configure network devices and choose the optimal network path (e.g. first path 460 or second path 470) for application traffic. In effect, the controller 10 may be configured to serve as a sort of operating system for the network 16. By taking the control plane off the network hardware and running it as software instead, the controller 10 may facilitate automated network management and makes it easier to integrate and administer business applications. OpenFlow is a programmable network protocol designed to manage and direct traffic among routers and switches from various vendors. It separates the programming of routers and switches from underlying hardware. OpenFlow may consists of three parts: flow tables installed on switches (e.g. node 12), a controller 10 and a proprietary OpenFlow protocol for the controller 10 to talk securely with switches 12. Flow tables are set up on switches 12. Controller 10 talks to the switches 12 via the OpenFlow protocol and impose policies on flows. The controller 10 could set up paths through the network optimized for specific characteristics, such as speed, fewest number of hops or reduced latency.

While FIG. 1A shows a particular number and arrangement of components, node 12 may include additional, fewer, different, or differently arranged components than those illustrated in FIG. 1A. Also, it may be possible for one of the components of node 12 to perform a function that is described as being performed by another one of the components. Node 12 may configured as a TDM capable optical switch, a router, a reconfigurable optical add/drop multiplexer (ROADM) such as Infinera's DTN-X packet optical transport capable switch, Infinera's EMXP packet-optical transport switch, or similar device configurable to provide Carrier Ethernet services. Node 12 may also be referred to as a device, such as a first device, a second device etc. The line module 21 may be configured as a packet switching module, such as Infinera's PXM module, that supports switching of VLAN tagged packets into ODUFlex or ODU2e circuits. This allows the node 12 to dynamically switch IP/MPLS router traffic over an OTN network using the VLAN label ID to the destination device. This may enable packet switching functionality over an OTN network with maximum network efficiency and scalability by combining the benefits of device bypass with standardized ODU0 level multi-service grooming and switching.

Line module 21 may include hardware components such as one or more ports 7-1, 7-2, . . . , 7-Y, or a combination of hardware and software components, that may provide network interface operations. Line module 21 may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between line modules 21. In one implementation, switching plane 22 may provide fully non-blocking transfer of data. As to be explained below, switching plane 22 may be programmed to transfer data from a particular input port 6 to a particular output port 6.

As shown in FIG. 1A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 1B:
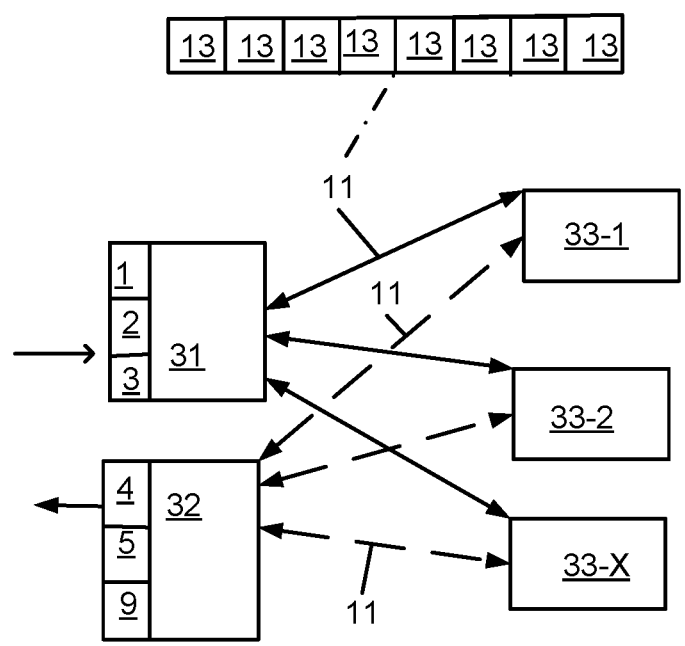
FIG. 1B illustrates an exemplary line module of the node in FIG. 1A in accordance with some examples of the disclosure.

FIG. 1B is a diagram of exemplary components of a line module 21. As shown in FIG. 1B, line module 21 may include a receiver (RX) photonic integrated circuit (PIC) 31 (e.g. a port 7-1), a transmitter (TX) PIC 32 (e.g. a port 7-2), and fabric managers (FMs) 33-1, 33-2, . . . , 33-X (referred to collectively as "FMs 33," and individually as "FM 33") (where X≥1). While FIG. 1B shows a particular number and arrangement of components, line module 21 may include additional, fewer, different, or differently arranged components than those illustrated in FIG. 1B. Also, it may be possible for one of the components of line module 21 to perform a function that is described as being performed by another one of the components.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 1B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 1C:
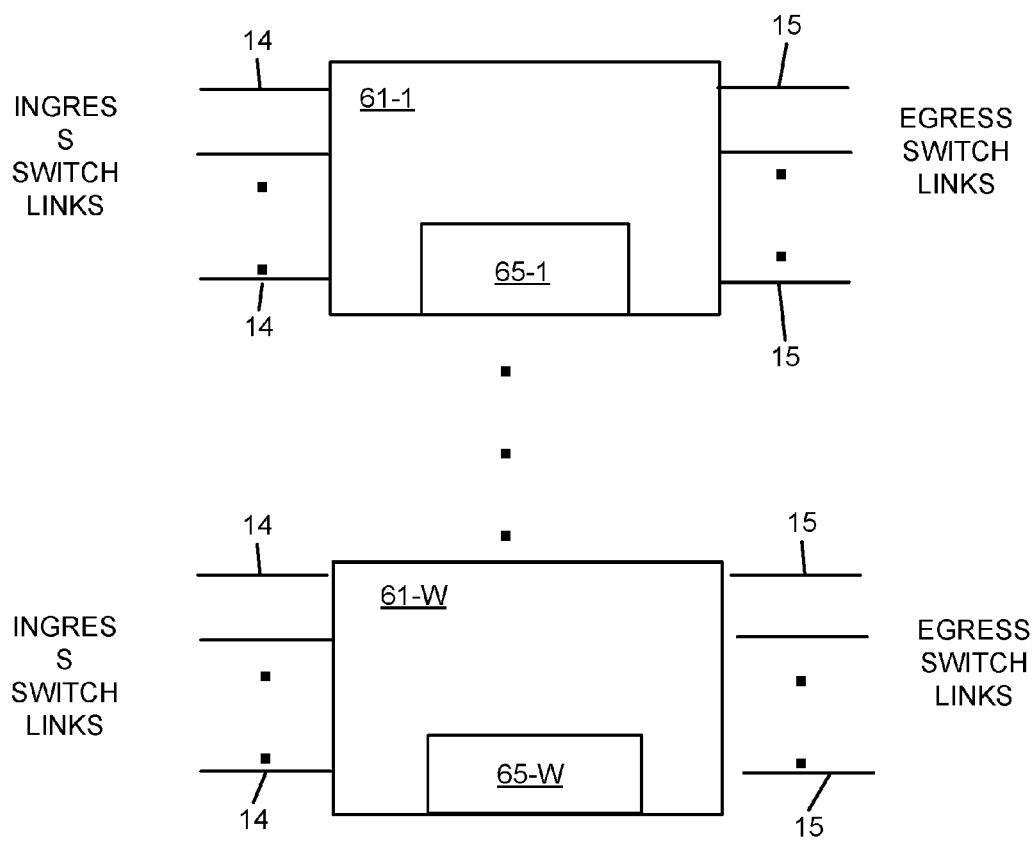
FIG. 1C illustrates an exemplary switch of the node in FIG. 1A in accordance with some examples of the disclosure.

FIG. 1C is a diagram of exemplary components of a switching plane 22. As shown in FIG. 1C, switching plane 22 may include switches 61-1, . . . , 61-W (referred to collectively as "switches 61," and individually as "switch 61") (where W≥1). While FIG. 1C shows a particular number and arrangement of components, switching plane 22 may include additional, fewer, different, or differently arranged components than those illustrated in FIG. 1C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
|---|---|---|---|
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

Figure 1D:
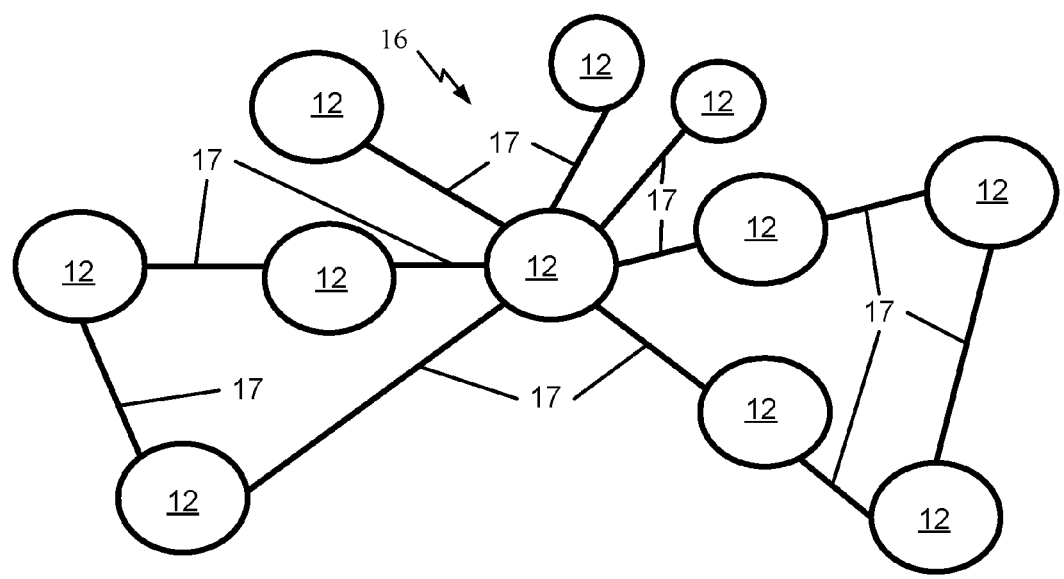
FIG. 1D illustrates an exemplary network configuration of the nodes in FIG. 1A in accordance with some examples of the disclosure.

FIG. 1D illustrates an exemplary network configuration of the nodes in FIG. 1A in accordance with some examples of the disclosure. As shown in FIG. 1D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a unidirectional or bi-direction medium such as an optical fiber capable of transporting an optical signal 6 or an electrical signal 11. The following examples describe apparatus and methods for use in conjunction with node 12.

Figure 2:
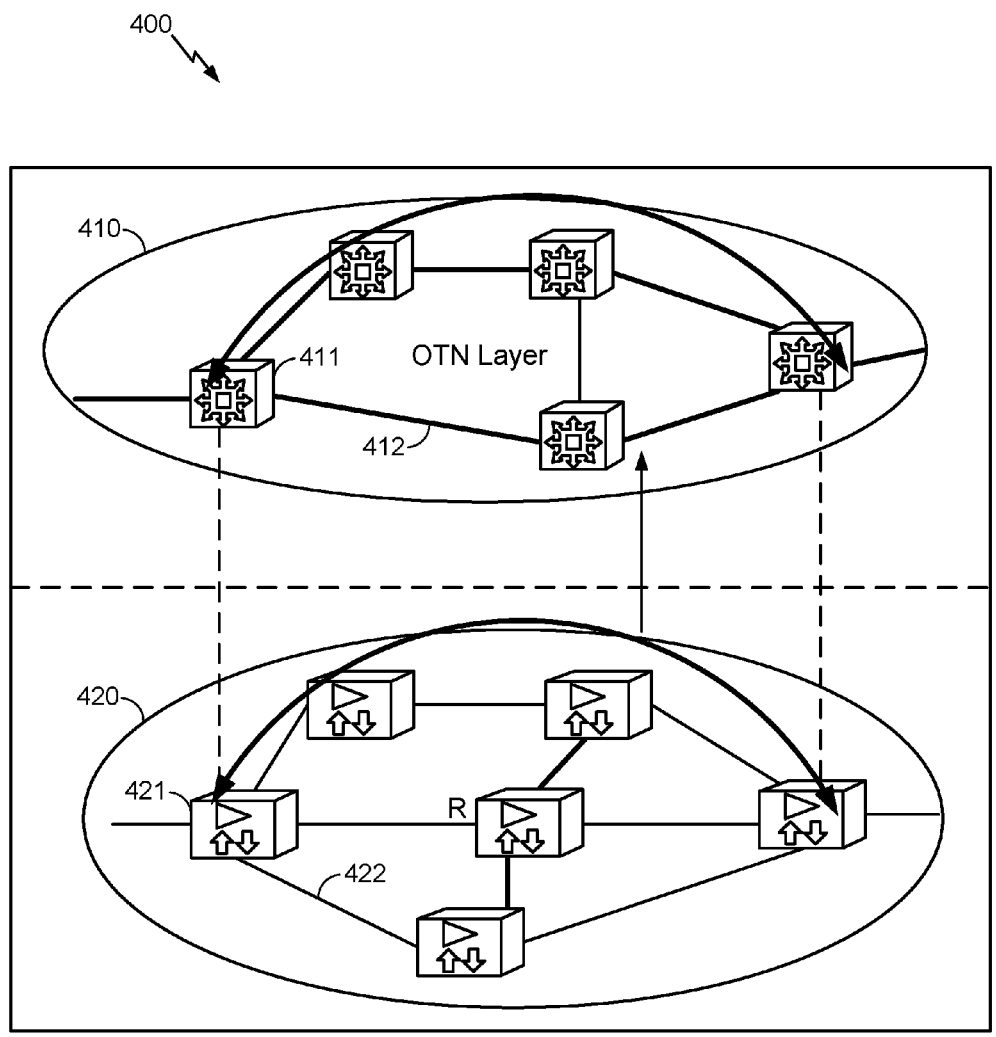
FIG. 2 illustrates a diagram of a multi-layered network in accordance with some examples of the disclosure.

FIG. 2 illustrates a diagram of a multi-layered network (e.g. network 16) in accordance with some examples of the disclosure. The multi-layer network may achieve network resource, such as node 12, isolation among clients using same server network, such as a VPN in a multi-layered network and interaction within the node 12. As shown in FIG. 2, a multi-layered optical communication network 400 may include a L1 TDM layer 410 (e.g. an OTN layer) and a L0 photonic layer 420 (e.g. an ILS network). The L1 layer 410 may include a plurality of TDM capable switches 411 (e.g. node 12) selectively connected together with a plurality of links 412 (i.e. connections 17 between nodes 12, such as optical fibers). The L0 layer 420 may include a plurality of ROADM switches 421 (e.g. node 12) selectively connected together with a plurality of links 422 (i.e. connections 17 between nodes 12, such as optical fibers). As shown in FIGS. 7-10 below, the L0 Layer 420 may allow partitioning/coloring of optical-TE interfaces (e.g. port 7) connections (e.g. connections 17) in photonic Layer (i.e. O-SNCs, optical LSPs, etc.), and optical TE Links (O-TE Links, such as connections 17). As shown in FIGS. 7-10 below, the L1 layer 410 may allow/enable digital LSPs/SNCs—connections in OTN/digital layer (ODU-SNCs), links and nodes in digital layer while optical LSPs in server layer form links in digital layer, L1 TE-interface inherit color/Affinity from L0 (default) with optional override, construction of Virtual Network Topologies (VNT), and L1-SNCs setup with Affinity (customer/VPN specific).

Figure 3:
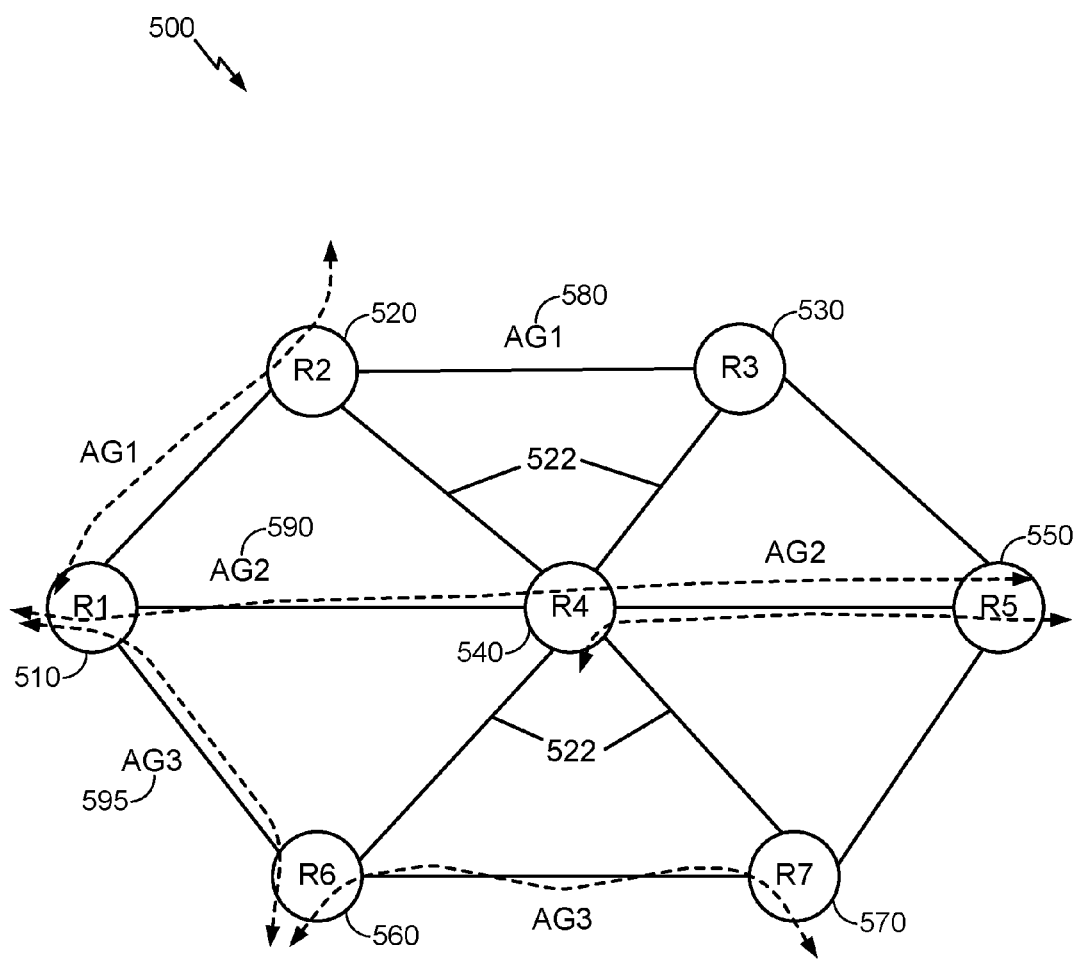
FIG. 3 illustrates a L0 network in accordance with some examples of the disclosure.
Figure 5:
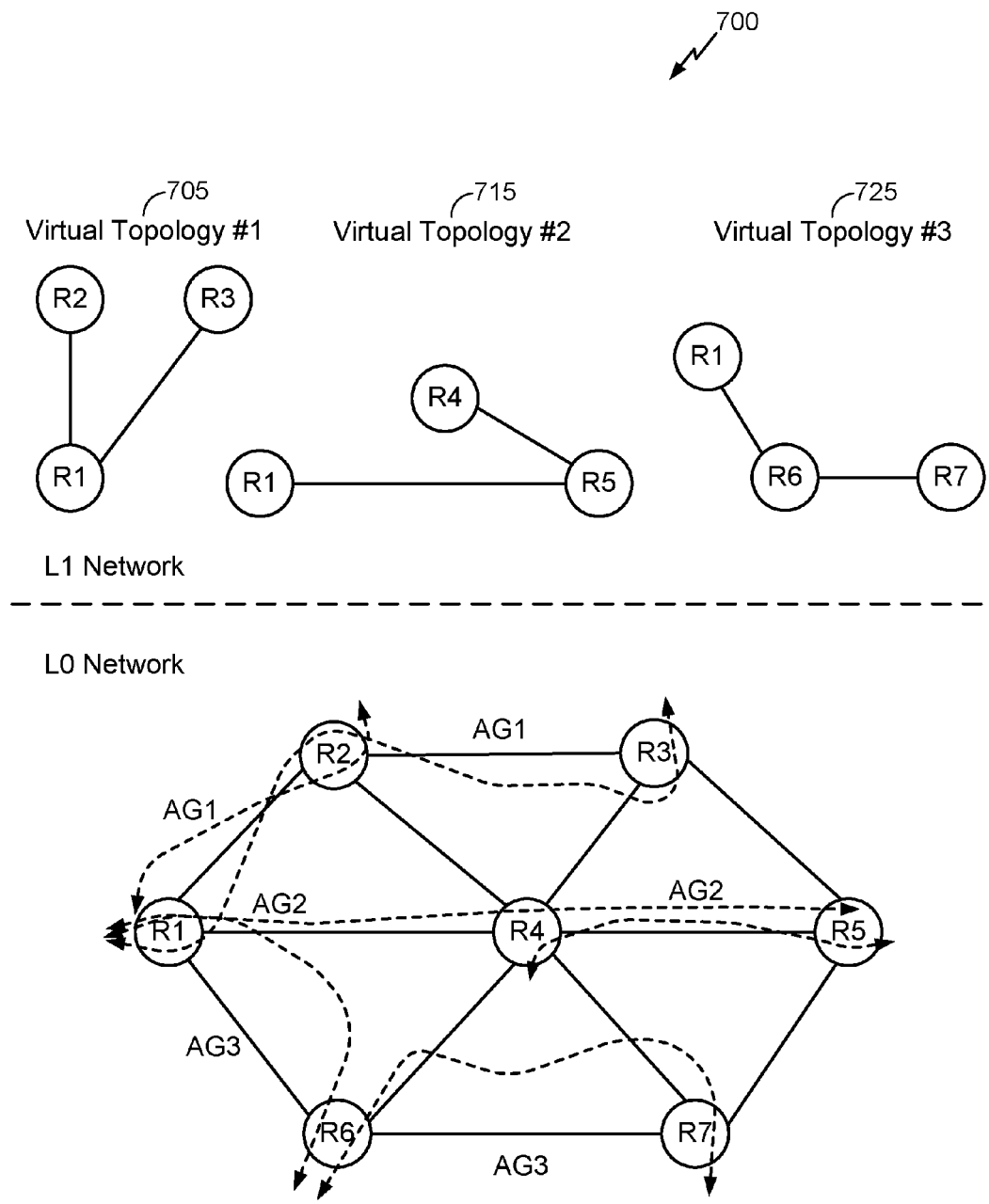
FIG. 5 illustrates exemplary virtual topologies in accordance with some examples of the disclosure.

FIG. 3 illustrates a L0 network in accordance with some examples of the disclosure. As shown in FIG. 3, a L0 network 500 may include a first switch 510 (e.g. node 12 or 800), a second switch 520 (e.g. node 12 or 800), a third switch 530 (e.g. node 12 or 800), a fourth switch 540 (e.g. node 12 or 800), a fifth switch 550 (e.g. node 12 or 800), a sixth switch 560 (e.g. node 12 or 800), and a seventh switch 570 (e.g. node 12 or 800) interconnected by links 522. The switches 510-570 may also be assigned to AG groupings such as a first grouping 580 (AG1), a second grouping 590 (AG2), and a third grouping 595 (AG3). The switches or nodes 510-570 may be spectrum/wavelength switching capable ROADMs. The links 522 between these switches may be marked or associated with specific AGs/Colors and this information may be advertised via Open Shortest Path First-TE (OSPF-TE, e.g. in accordance with RFC 3630) throughout the network 500. As shown in FIG. 5, the dotted lines show connections (SNCs) over these links 522. The SNCs may be constrained such that they use resources from links 522 with specific colors/AG.

Figure 4:
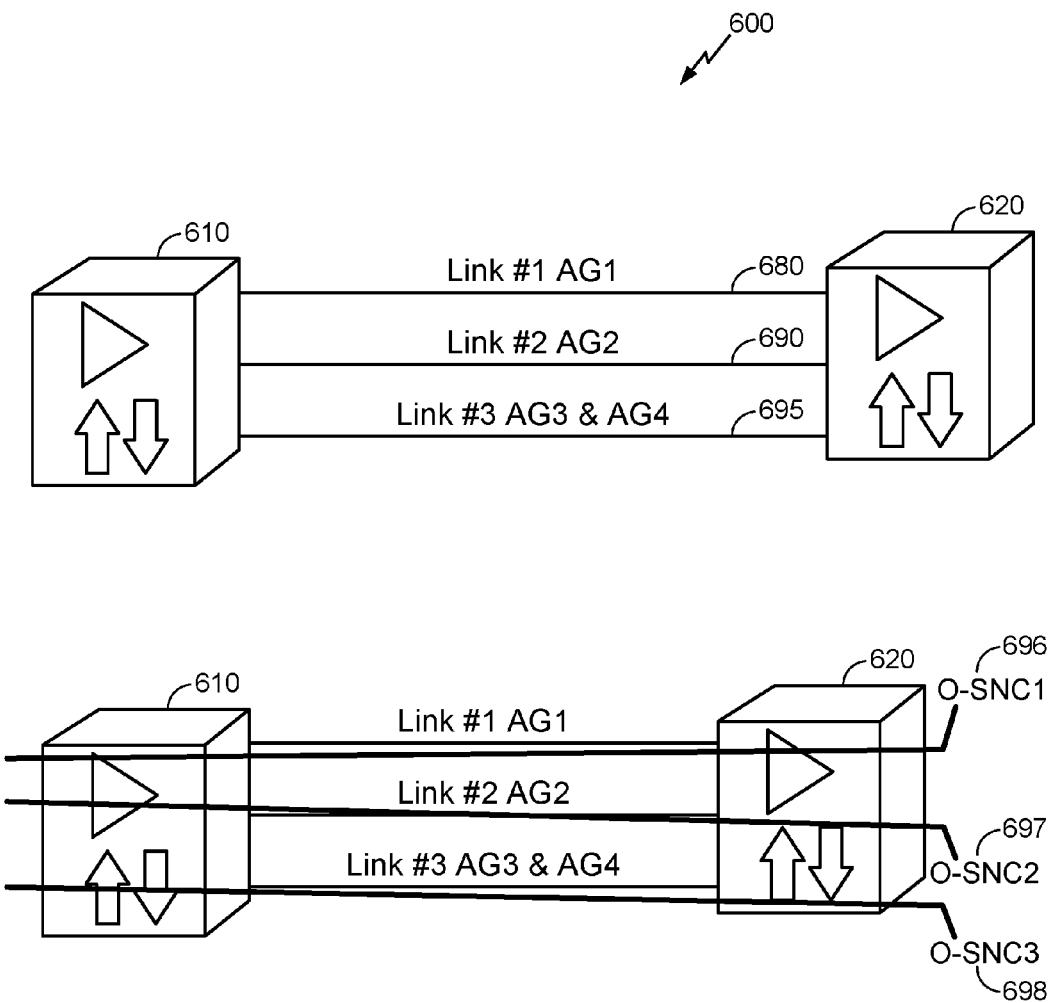
FIG. 4 illustrates exemplary L0 links and L0 connections between network elements in accordance with some examples of the disclosure.

FIG. 4 illustrates exemplary L0 links and L0 connections between network elements in accordance with some examples of the disclosure. As shown in FIG. 4, an L0 network 600 may include a first switch 610 (e.g. node 12 or 800) connected with a second switch 620 (e.g. node 12 or 800) thorough a first link 680, a second link 690, and a third link 695 partitioned in to different colors/Admin Groups. The network 600 may also include a first connection 696 (O-SNC1), a second connection 697 (O-SNC2), and a third connection 698 (O-SNC3) setup over partitioned L0-links. The partitioning of L0 network resources may be based on policies of the network operator. For example customers needing complete isolation will have dedicated TE-Links in L0 network. The network resources are partitioning by configuring TE-Links with colors/AGs. For example with reference to FIG. 3, the first switch 510 to the second switch 520 and the second switch 520 to the third switch 530 may be configured with AG1/Green 580 (e.g. meant for use by customer #1), the first switch 520 to the fourth switch 540 and the fourth switch 540 to the fifth switch 550 may be configured with AG2/Blue 590 (e.g. meant for use by customer #2), the first switch 520 to the sixth switch 560 and the sixth switch 560 to the seventh switch 570 may be configured with AG3/Red 595 (e.g. meant for use by customer #3) with the L0-LSPs or SNCs may be setup with Affinities. The path computation on the switch constrains use of links with specific colors only. For example with reference to FIG. 4, SNC 696 setup with this affinity=AG1 680 uses TE-Links marked as AG1, SNC 697 setup with this affinity=AG2 690 uses TE-Links marked as AG2, and SNC 698 setup with this affinity=AG3 695 uses TE-Links marked as AG3.

FIG. 5 illustrates exemplary virtual topologies in accordance with some examples of the disclosure. As shown in FIG. 5, a network 700 may include a first Virtual Network Topology (VNT) 705, a second VNT 715, and a third VNT 725 that are visible in L1 due to the resource partitioning in L0 discussed with reference to FIGS. 3 and 4.

Figure 6:
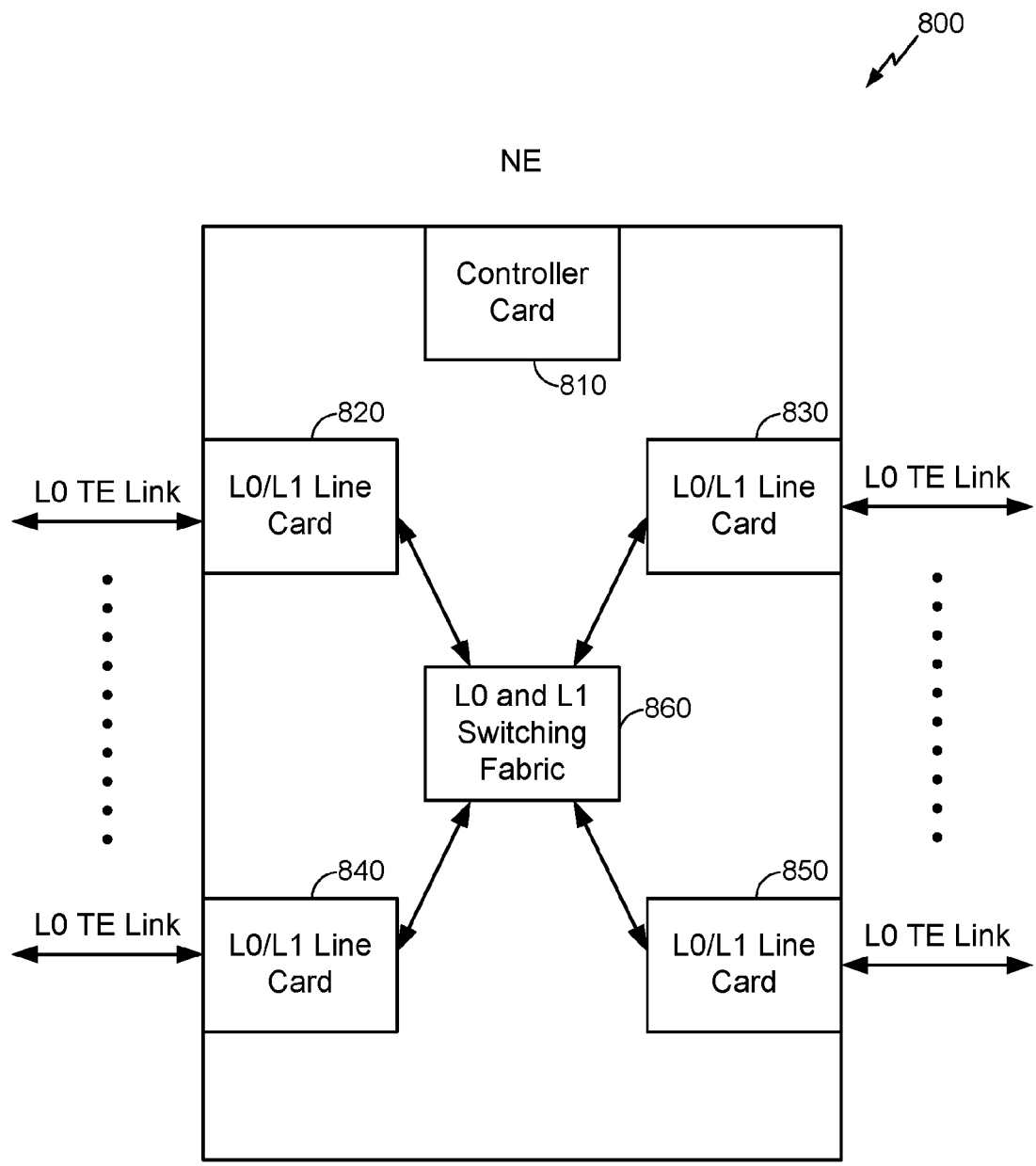
FIG. 6 illustrates exemplary multi-layer interaction capable network element in accordance with some examples of the disclosure.

FIG. 6 illustrates exemplary multi-layer interaction capable network element in accordance with some examples of the disclosure. As shown in FIG. 6, a network element 800 (e.g. node 12) may include a controller card or module 810, a first L0/L1 line card 820, a second L0/L1 line card 830, a third L0/L1 line card 840, and a fourth L0/L1 line card 850. The line cards 820-850 may be connected to L0 TE links for input and output of signals and connected to a L0 and L1 switch fabric 860 for switching signals between line cards. Module 810 may be configured to control the switch fabric 860 and the line cards 820-850 to enable the functionality described herein.

Figure 7:
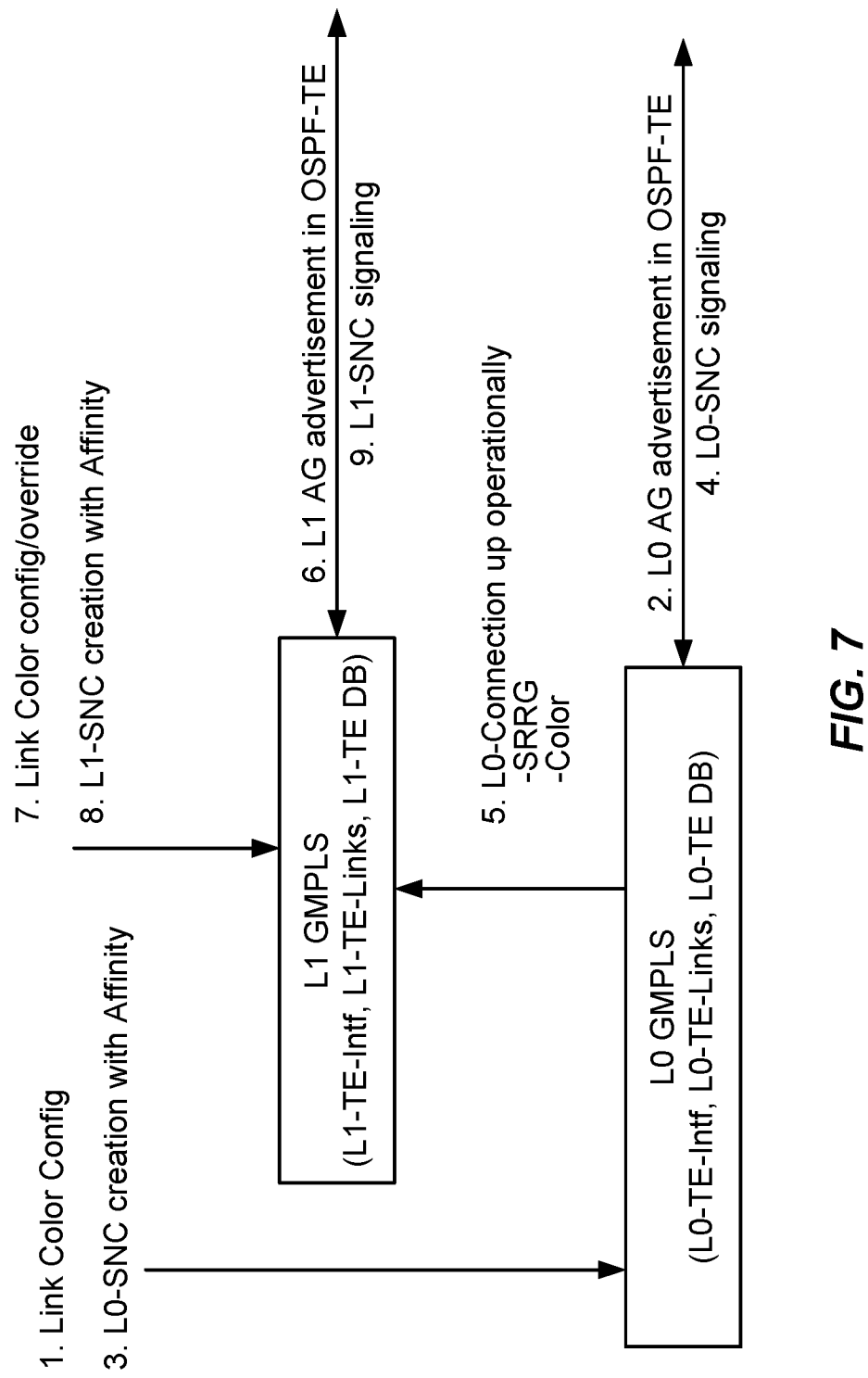
FIG. 7 illustrates operations and interactions of a multi-layer interaction capable network element in accordance with some examples of the disclosure.

FIG. 7 illustrates operations and interactions of a multi-layer interaction capable network element in accordance with some examples of the disclosure. As shown in FIG. 7, a network element 800 may be configured for the illustrated operations and interactions including the color/partition/AG information ported to L1 along with SRRG information and enable the L1 TE-Links to use this information with the network element 800 and associated database (e.g. L1-TE DB and L2-TE DB) to provide Virtual Network Topology (VNT) services. The operations and interactions may include link color configuration, L0 AG advertisements in OSPF-TE, L0-SNC creation with Affinity, L0-SNC signaling, L0 connection up operationally including SRRG and color, L1 AG advertisement in OSPF-TE, L1 color configuration and override, L1-SNC creation with Affinity, and L1-SNC signaling.

Figure 8:
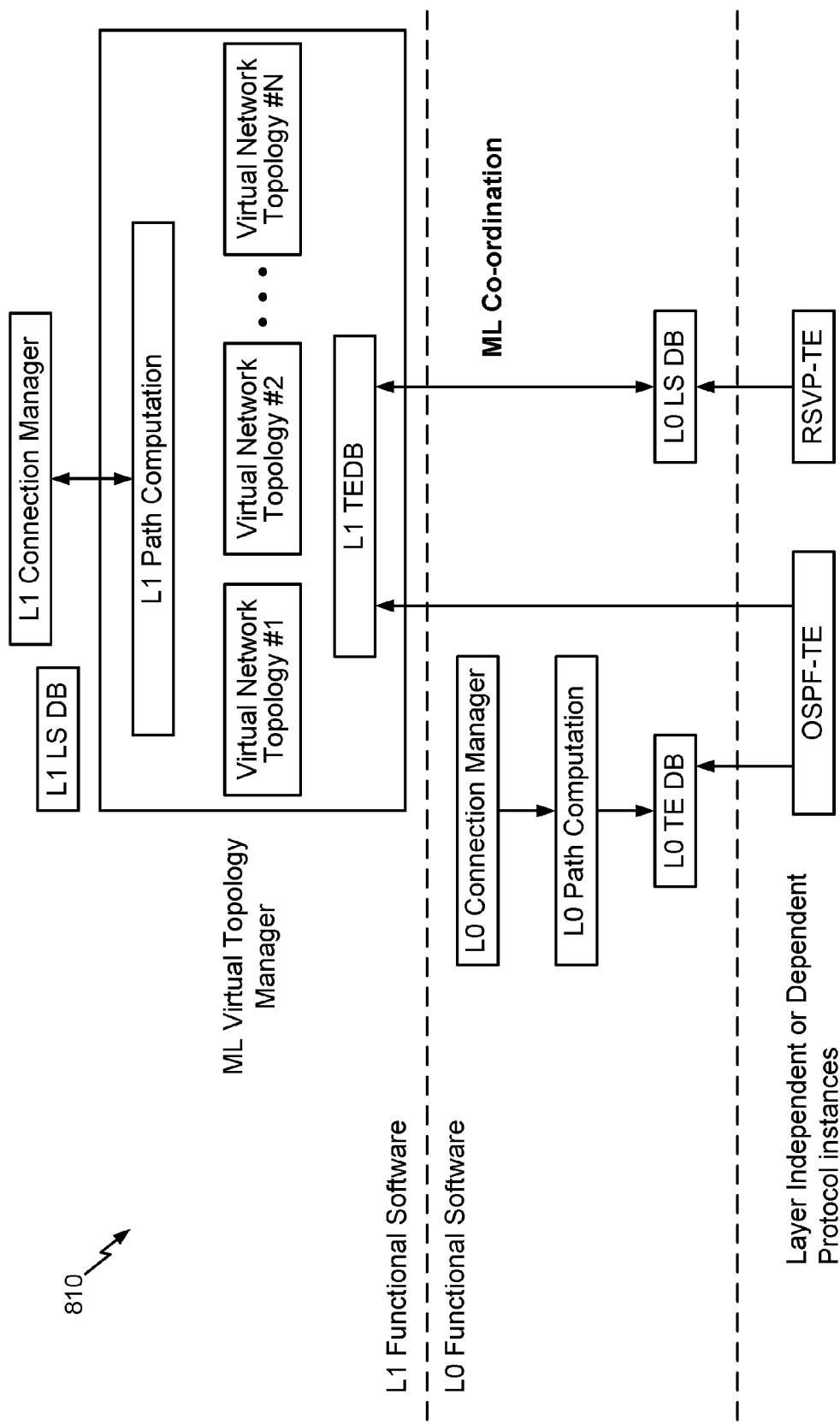
FIG. 8 illustrates interactions with a controller module of a multi-layer interaction capable network element in accordance with some examples of the disclosure.

FIG. 8 illustrates interactions with a controller module of a multi-layer interaction capable network element in accordance with some examples of the disclosure. As shown, a controller module 810 may include the various functionality and interactions shown in conjunction with a multi-layered virtual topology manager and a multi-layered co-ordination module.

Figure 9:
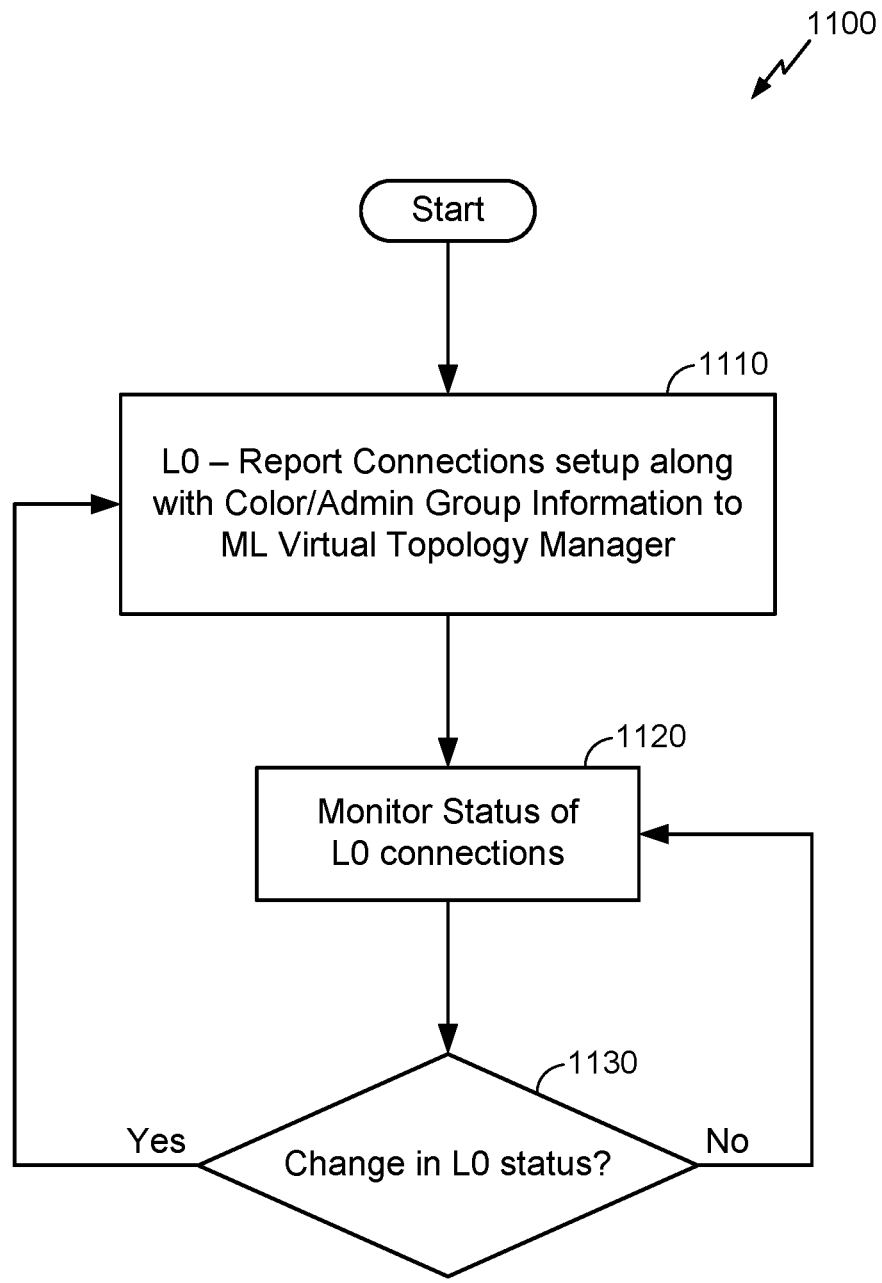
FIG. 9 illustrates an exemplary process for L0 reporting connection information to L1 in accordance with some examples of the disclosure.

FIG. 9 illustrates an exemplary process for L0 reporting connection information to L1 in accordance with some examples of the disclosure. As shown, the partial process 1100 begins in block 1110 with a network element (e.g. node 12 or 800) L0 layer reporting connections setup along with color/AG information to a controller (e.g. controller 810) with a multi-layered virtual topology manager module. Next in block 1120, the network element monitors the status of L0 connections reported to the controller. Next in block 1130, a determination is made whether a change in a L0 connection status has occurred. If no, the process returns to block 1120 to continue monitoring the L0 connections. If yes, the process returns to block 1110 to report the new connection information to the multi-layered topology manager module of the controller. The process 1100 illustrates a sequence for the L0 layer updating the L1 layer about connections and their affinities.

Figure 10:
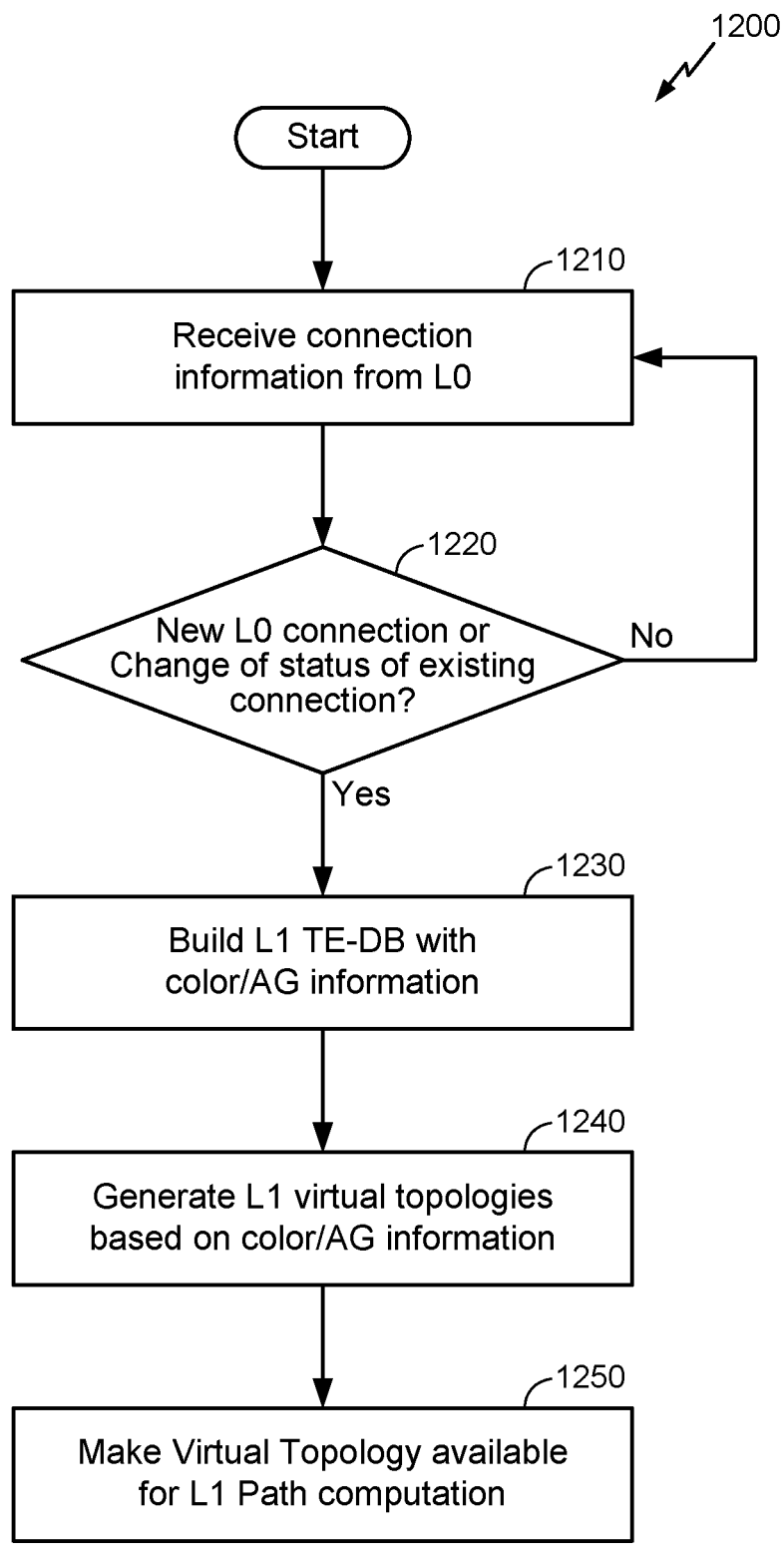
FIG. 10 illustrates an exemplary process for L1 building virtual topologies based on information received from L0 in accordance with some examples of the disclosure.

FIG. 10 illustrates an exemplary process for L1 building virtual topologies based on information received from L0 in accordance with some examples of the disclosure. As shown in FIG. 10, the partial process 1200 illustrates how the L1 layer (e.g. the controller 810 or multi-layered virtual topology manager module builds the Virtual Network Topology based on the information received from the L0 layer, such as the multi-layered coordination manager module. The partial process begins in block 1210 with the controller 810 receiving connection information from the L0 layer (e.g. process 1100). Next in block 1220, the process determines whether the controller 810 has received information about a new L0 connection or a change of status of an existing connection already reported. If no, the process returns to block 1210. If yes, the process proceeds to block 1230. In block 1230, the controller 810 builds a L1 TE database (L1 TE-DB) with the color and AG information received in block 1210. Next in block 1240, the controller generates L1 virtual topologies (e.g. VNT 705, 715, and 725) based on the color and AG information received in block 1210. In block 1250, the partial process concludes with making the L1 virtual topologies available for L1 path computations between switches (e.g. switches 510-570). The various elements and processes disclosed herein illustrate exemplary methods and systems that may be used construct Virtual Topologies in a multi-layered capable network element (e.g. node 12 or 800) and how VNTs may be used to offer L1-VPN services in multi-layered networks. These concepts may be extended for L2/MPLS over L0 networks (IP over DWDM) and the functionality may reside within one or more network elements (e.g. node 12 or 800) or outside such a network element, such as a centralized software defined network server or apparatus (e.g. a software defined network environment).

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
   configuring a first optical link in a photonic network at a node in the photonic network, the photonic network configured to transport each of a plurality of optical signals, each of the plurality of optical signals having a respective one of a plurality of wavelengths;
   supplying connection information to node, the connection information being indicative of connections for a grouping of the plurality of optical signals, the connection information being carried by a layer L0 signal that is supplied to the node;
   assigning a first optical signal of the plurality of optical signals to the first optical link, the first optical signal having a first wavelength of the plurality of wavelengths;
   assigning the first optical link to a first grouping of optical links of the photonic network;
   associating the first grouping of optical links with a plurality of switches;
   associating the first optical signal with the plurality of switches;
   based on the L0 signal, storing layer L1 information in a database, the first grouping of optical links and the first optical signal being associated with a controller of a time division multiplexed network, which corresponds to the L1 information, the time division multiplexed network configured to transport each of a plurality of packets with a digital frame format in a respective one of a plurality of time slots and the controller comprises a memory and a logic circuit configured to communicate with the plurality of switches;
   generating layer L1 virtual topologies associated with the photonic network based on the layer L1 information in the database;
   configuring the plurality of switches based on the L1 virtual topologies; and
   transmitting the first optical signal over the first optical link.

2. The method of claim 1, further comprising:
   assigning the first optical link to a first grouping of time slots of the plurality of time slots based on the first grouping of optical links; and
   associating the first grouping of time slots with the plurality of switches.

3. The method of claim 2, further comprising re-assigning the first optical link to a second grouping of time slots of the plurality of time slots, a third grouping of time slots being different than the second grouping of time slots.

4. The method of claim 3, further comprising monitoring a status of the link.

5. The method of claim 1, further comprising computing a transport path between a first switch of the plurality of switches and a second switch of the plurality of switches.

6. The method of claim 1, wherein the controller is incorporated in one of the plurality of switches.

7. The method of claim 1, wherein each of the plurality of switches is configured to transport the plurality of wavelengths and transport the plurality of packets.

8. The method of claim 7, wherein at least one of the plurality of switches is configured as a reconfigurable optical add drop multiplexer.

9. An apparatus comprising:
   a controller of a time division multiplexed network, the time division multiplexed network configured to transport each of a plurality of packets with a digital frame format in a respective one of a plurality of time slots and the controller comprises a memory and a logic circuit configured to:
   configure a first optical link in a photonic network, the photonic network configured to transport each of a plurality of optical signals, each of the plurality of optical signals having a respective one of a plurality of wavelengths;
   assign a first optical signal of the plurality of optical signals to the first optical link, the first optical signal having a first wavelength of the plurality of wavelengths;
   assign the first optical link to a first grouping of optical links of the photonic network;
   associate the first grouping of optical links with a plurality of switches, connection information indicative of the first grouping being carried by an L0 signal that is supplied to a node in the photonic network in communication with the controller;
   based on the L0 signal, store layer L1 information in a database;
   generate layer L1 virtual topologies associated with the photonic network based on the layer L1 information in the database;
   associate the first optical signal with the plurality of switches, the plurality of switches being configured based on the layer L1 information in the database;
   associate the first grouping of optical links and the first optical signal with the controller; and
   transmit the first optical signal over the first optical link.

10. The apparatus of claim 9, wherein the controller is further configured to:
    assign the first optical link to a first grouping of time slots of the plurality of time slots based on the first grouping of optical links; and
    associate the first grouping of time slots with the plurality of switches.

11. The apparatus of claim 10, wherein the controller is further configured to re-assign the first optical link to a second grouping of time slots of the plurality of time slots, a third grouping of time slots being different than the second grouping of time slots.

12. The apparatus of claim 11, wherein the controller is further configured to monitoring a status of the link.

13. The apparatus of claim 11, wherein the controller is further configured to compute a transport path between a first switch of the plurality of switches and a second switch of the plurality of switches.

14. The apparatus of claim 1, wherein the controller is incorporated in one of the plurality of switches.

15. The apparatus of claim 9, wherein each of the plurality of switches is configured to transport the plurality of wavelengths and transport the plurality of optical signals in the digital frame format.

16. The apparatus of claim 15, wherein at least one of the plurality of switches is configured as a reconfigurable optical add drop multiplexer.

* * * * *